Figure 1:
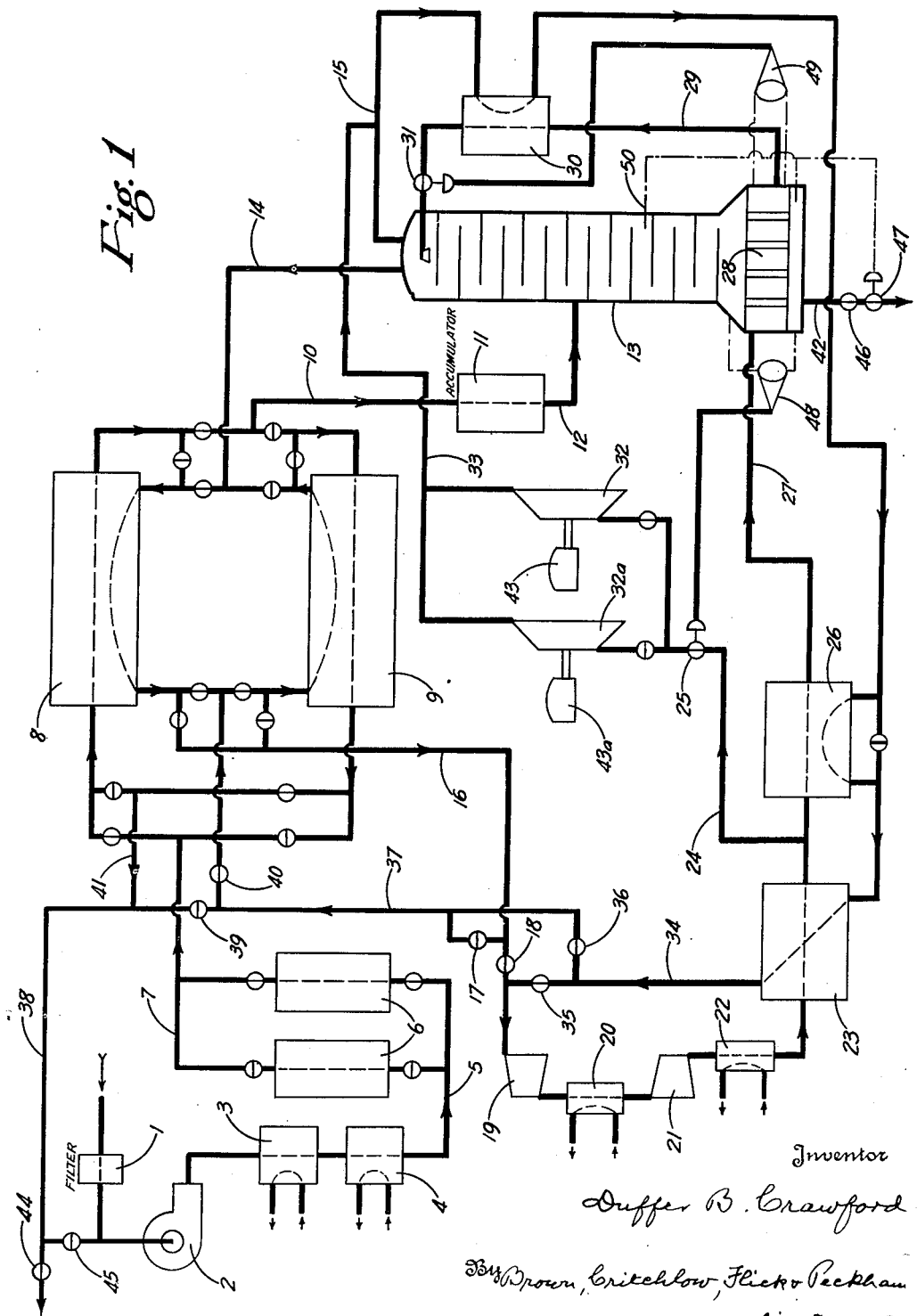

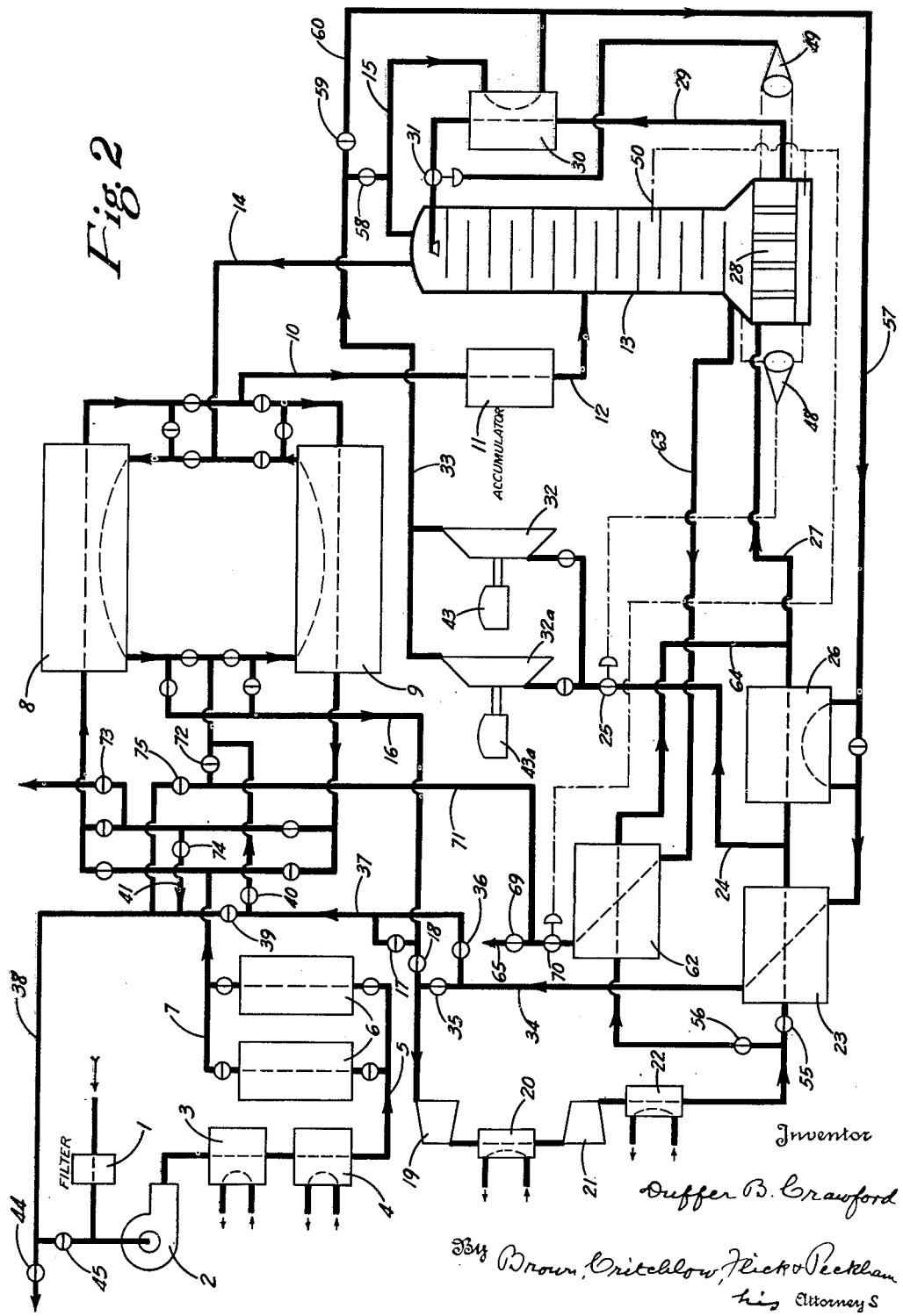

Oct. 24, 1950     D. B. CRAWFORD     2,526,996
METHOD AND APPARATUS FOR SEPARATING MIXED GASES
Filed Feb. 21, 1947     4 Sheets-Sheet 3

Inventor
Duffer B. Crawford
By Brown, Critchlow, Flick & Peckham
his Attorneys

Patented Oct. 24, 1950

2,526,996

UNITED STATES PATENT OFFICE 2,526,996

METHOD AND APPARATUS FOR SEPARATING MIXED GASES

Duffer B. Crawford, Jeannette, Pa., assignor to Elliott Company, Jeannette, Pa., a corporation of Pennsylvania Application February 21, 1947, Serial No. 730,081

18 Claims. (Cl. 62—123)

This invention relates to the separation of mixed gases into separate components by cooling and rectification, and more particularly to a method and apparatus for separating air into its two main constituents in order to recover oxygen of high purity in either liquid or gaseous form.

Most of the well-known processes for producing either liquid or gaseous oxygen have the following characteristics in common. The air to be separated is compressed and then cooled to a low temperature and liquefied by indirect heat exchange with the available cold products of rectification augmented by an air stream cooled by passage through an expander. The expanded stream of air, in addition, furnishes some or all of the refrigeration required to compensate for heat leakage and other thermodynamic losses of the system. These same characteristics, however, have certain disadvantages that increase the cost and complexity of producing oxygen, whether in liquid or in gaseous form; and so far as I am aware, no simple, effective and economical method has heretofore been proposed to overcome those disadvantages.

When liquid oxygen is produced by conventional processes, a considerable amount (usually between twenty-five and fifty percent) of the oxygen in the air is not recovered. This low yield is caused by the fact that the liquid oxygen withdrawn from the system is not available as a refrigerant, so equivalent refrigeration must be supplied by compressing and expanding more air. If the additional air is used only as a refrigerant and is not rectified (as in a well-known variation of the Claude process), the oxygen in that air is obviously wasted. If the additional air is also rectified (as in the Heylandt process), it is impossible or impracticable to obtain sufficient pure liquid nitrogen reflux to rectify all of the air completely, so a considerable amount of oxygen escapes from the rectification column along with the waste nitrogen. In either case, the cost of producing each pound of liquid oxygen is increased, since more energy is consumed in compression and more impurities are introduced into the system than would be necessary if substantially all of the oxygen contained in the entering air were recovered.

It is among the objects of my invention to provide a gas separation method and plant, particularly suited for air separation, by which substantially all of the oxygen contained in the entering air may be recovered in liquid form with a low consumption of power and with the introduction of a minimum amount of impurities into the system.

When the conventional processes of air separation are used to produce gaseous oxygen, other disadvantages become apparent. For one, the condensible impurities contained in the air, such as water vapor, carbon dioxide and acetylene, are not adequately removed. The carbon dioxide that passes through the heat exchangers is deposited farther along in the system and blocks the piping, valves, reboiler etc. Although only minute traces of acetylene are present in the atmosphere, appreciable quantities of it enter an air separation plant over a period of time. Unless substantially all of it is removed from the air before the latter is rectified, or unless liquid oxygen is continually withdrawn from the column as it is in a liquid oxygen plant, the acetylene may accumulate in the liquid oxygen at the bottom of the column and cause an explosion. In order to condense substantially all of the acetylene and keep it from reaching explosive concentrations in the column, the entering air must be cooled to a temperature of approximately —305° F. or lower before it is rectified. That low temperature is not attained in conventional plants where the air can be cooled only to around —285° F. or higher; that is, to its liquefaction temperature at a pressure of at least four or five atmospheres absolute. As a result, conventional plants have adopted various expedients to minimize or prevent the explosion hazard from acetylene, including protection of the liquid oxygen sections of the plant with armour plate to localize the effects of any explosion, or bleeding off a portion of the liquid oxygen from the column to lower the concentration of acetylene therein.

It is another object of my invention to provide a method and apparatus for the separation of gaseous oxygen from air, whereby substantially all of the acetylene and other impurities in the air may be simply and economically removed before the air is rectified, and whereby long operating cycles are obtained.

Another disadvantage of conventional air separation processes, particularly when they are used to produce gaseous oxygen, is that the air usually must be compressed to a high pressure and then rectified in two stages. The two-stage rectification requires a double column having a complex high pressure section, which is expensive to construct and difficult to operate.

It is a further object of my invention to provide a method and apparatus by which gaseous oxygen of high purity may be recovered from the air in a single rectification column without compressing the air to a pressure in excess of that required to assure its flow through the system.

It is a further disadvantage of conventional gaseous oxygen plants that they cannot be economically operated considerably below their designed capacities. Such reduced operation is frequently necessary or desirable, for example, in supplying oxygen for use in various metallurgical processes which are themselves subject to wide fluctuations in their levels of operation.

It is a further object of my invention to obtain high recovery, compared with other plants, of products of consistent purity, and to increase the flexibility of a gas separation plant so that this can be done economically even at greatly reduced levels of operation.

In accordance with this invention, the gas to be separated, such as air, is not compressed and subsequently expanded to produce refrigeration. Instead, all of the refrigeration required to compensate for heat leakage and other thermodynamic losses of the system as a whole under varying operating conditions is obtained by recycling the desired amount of the separated nitrogen, compressing it, and then expanding it, usually to substantially atmospheric pressure, with performance of external work. When making liquid oxygen, the refrigeration necessary to compensate for that lost in the liquid product is obtained in the same way by recycling nitrogen. Likewise, all of the liquid reflux necesary for complete rectification of the air under varying operating conditions is obtained by recycling the desired amount of nitrogen, compressing it, and then cooling and condensing the compressed gas to a liquid. The air to be separated is compressed only to a pressure sufficient to assure its flow through the apparatus without abrupt change in pressure. The same result may be obtained by using suction at the plant outlets so that the air will be blown through by atmospheric pressure instead of by a blower. In either case, before rectification the air is cooled to substantially its liquefaction temperature by only a stream of the cold nitrogen, preferably directly from the rectifying column. The nitrogen effluent sometimes may be augmented by expanded nitrogen that has been recycled. By cooling the air only with the cold nitrogen, which is the more volatile and colder product of rectification, the air is cooled below —305° F., whereby sufficient water, carbon dioxide, acetylene and other hydrocarbons are removed to avoid shut-downs and explosions.

Figure 4:
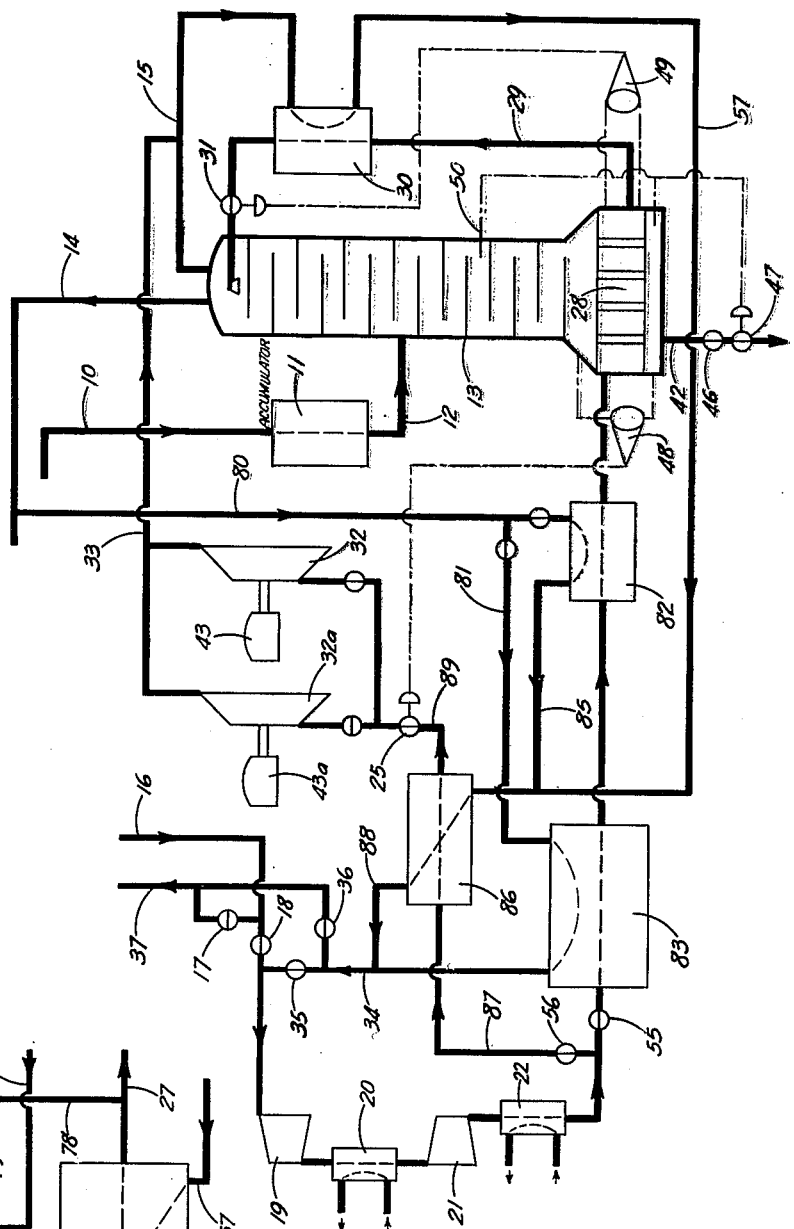
Figure 3:
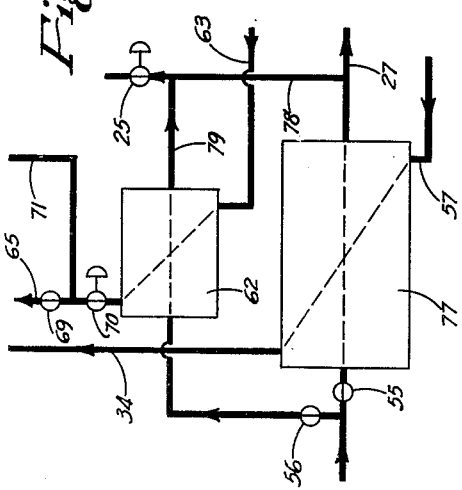
Figure 5:
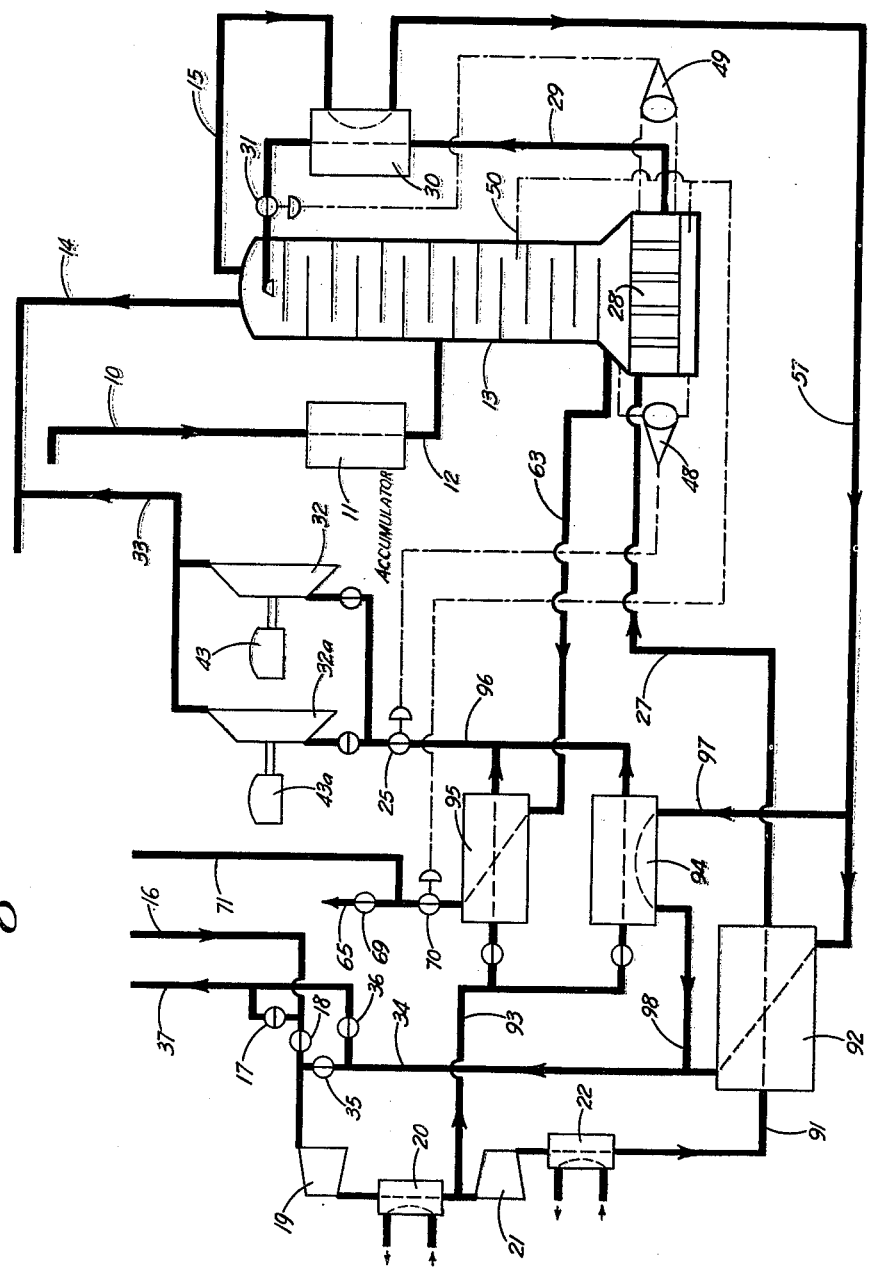

Apparatus and arrangement thereof for the practice of my invention are diagrammatically illustrated, with reference to the production of oxygen from air, in the accompanying drawings, of which Fig. 1 shows a preferred apparatus suitable for the production of liquid oxygen; Fig. 2 shows a preferred apparatus suitable for the production of gaseous oxygen; Fig. 3 is a modification of the part of the plant shown in the lower left-hand corner of Fig. 2; Fig. 4 illustrates a modification of a liquid plant and shows fragmentarily a system similar to Fig. 1 with the understanding that the omitted portion of Fig. 4 is the same as the apparatus shown at the top and in the upper left-hand corner of Fig. 1; and Fig. 5 represents a modified form of plant for producing oxygen gas and shows fragmentarily a system similar to Fig. 2 with the understanding that the omitted portion of Fig. 5 is the same as the apparatus shown at the top and in the upper left-hand corner of Fig. 2. It is to be understood that this invention is not limited to the separation of air, and that it is equally applicable to the separation of other mixed gases which are capable of separation into two main constituents by cooling and rectification.

The procedure to produce liquid oxygen in accordance with my invention will be understood by reference to Fig. 1, in which air is introduced into the system through a filter 1 and then is forced through the system by a blower 2 at a pressure not exceeding materially that required to overcome the frictional resistance to its travel. Usually a pressure at the blower of less than 20 lbs. per sq. in. absolute, which is referred to herein as being substantially atmospheric pressure, is sufficient to assure movement of the air through the apparatus. Such a pressure is easily obtainable in various types of blowers that require no internal lubrication and accordingly do not contaminate the air with undesirable hydrocarbons. The heat of compression is removed from the air by an after-cooler 3 of the usual type. A large proportion of the moisture contained in the air is condensed in a refrigerating unit 4, such as a Freon dehumidifier, which cools the air below its dew point but not to a temperature low enough to cause frosting of the unit. The partially dehumidified air then is led by a pipe 5 to a drier 6, containing silica gel or other dehumidifying material, where most of the remaining water vapor is removed. It is advantageous to employ two such drying units alternately, so that while one is drying the air, the accumulated moisture in the other may be removed by conventional means not shown on the drawings. The air to be separated, now practically free of moisture, is led by a pipe 7 to either of a pair of heat exchangers 8 or 9, as determined by the operation of the appropriate valves. It will be assumed herein that at this time the air is flowing through exchanger 8 wherein the air is cooled to its liquefaction temperature or to slightly above that temperature by indirect heat exchange with approximately the same number of moles of the cold nitrogen effluent produced in the system and flowing in a countercurrent direction through the exchanger.

Heat exchangers 8 and 9 are of the usual type providing indirect heat exchange between countercurrent flows of two gases. They are preferably connected and operated as described in my copending application for a Gas Purification Method and Apparatus, Serial No. 662,937, filed April 18, 1946, and are so shown in the attached drawings. These heat exchangers may be operated continuously and economically for indefinitely long periods. When impurities condensed from the air in one exchanger begin appreciably to impair its performance, the cold nitrogen and the incoming air are switched over to the other exchanger. The impurities condensed in the first exchanger then are removed by passing waste nitrogen through the nitrogen passage of that exchanger in a reverse direction to its usual flow, i. e. from the warm to the cold end of the exchanger and then through the air passage in a reverse direction to the usual flow of air, i. e. from the cold to the warm end of the exchanger. In this clean-up cycle, the condensed impurities in the air passage are sublimed and carried out of the exchanger by the waste nitrogen, but only a minimum amount of heat is transferred to the exchanger, resulting in economy of refrigeration.

Further description of exchangers 8 and 9 and their operation will be found in my copending application and therefore need not be repeated here.

The cold air from which low volatile impurities have been removed in the heat exchangers is led by a pipe 10 to an accumulator 11, filled with silica gel, activated charcoal, alumina or other suitable material. Because of the heat capacity of such a substance, it acts as a reservoir of refrigeration and because of its absorbent capacity for air at very low temperatures, as a reservoir of air. These characteristics of the accumulator decrease the temperature and pressure fluctuations in the air stream caused by switching the incoming air from one pair of heat exchangers to the other when one has become plugged by the impurities condensed therein. If, for example, the air is cooled in one of the exchangers to about its liquefaction temperature during a typical four-hour cooling cycle, the stream of cold air entering the accumulator will hold the silica gel therein at substantially this same temperature. Thereafter, when the temperature of the air leaving the exchanger system rises appreciably, as it momentarily will during a switching operation, the warmer air entering the accumulator will be cooled by the silica gel, which will in turn be warmed slightly. However, because of the relatively large quantity of silica gel, its temperature rise is small during any one switching period; so that the temperature of the air leaving the accumulator will rise only slightly above its liquefaction temperature. During the following four-hour cooling cycle, when the second exchanger is cooling and purifying the air, the silica gel in the accumulator is gradually cooled back to the air liquefaction temperature. As a result, the momentary temperature rise of the air entering the accumulator during the switching operation is reduced considerably in magnitude as the air passes through the accumulator, and its effect is distributed over a relatively long period.

An additional advantage of the use of silica gel or similar adsorptive materials arises in their tendency, already referred to, to oppose pressure fluctuations in the air stream. This advantage depends upon the capacity of such materials to adsorb gases, a capacity that increases with an increase in pressure and a decrease in temperature. In an accumulator filled with silica gel, for an example, and maintained at air liquefaction temperature, a very large volume of air is adsorbed in the silica gel. When momentary pressure fluctuations occur in the air stream leaving the exchanger system as a result of interruptions in flow during a switching operation, those fluctuations are dampened in the accumulator. Both increases and decreases in the pressure may occur, depending upon the timing of the opening and closing of the various switching valves and their speed of operation. If the air entering the accumulator is at a lower pressure than before, it causes the release of a large volume of air previously adsorbed by the silica gel, thus reducing the magnitude of the drop in pressure in the air stream leaving the accumulator. As the pressure of the air entering the accumulator returns to its normal operating level, air is readsorbed by the silica gel. Likewise, a switching operation which causes a momentary increase in the air pressure results in the adsorption of an additional large volume of air in the accumulator, which is gradually released as the pressure of the air stream leaving the exchanger falls to its normal value. In this way, pressure variations in the air stream leaving the exchanger system are, in passing through the accumulator, reduced in magnitude and extended over a long period. Accordingly, the accumulator serves the purpose of dampening both pressure and temperature fluctuations in the air stream, resulting in a minimum of disturbance in the operation of other apparatus in the plant.

From the accumulator, the air is introduced by a pipe 12 into an intermediate level of a single rectification column 13 as a vapor substantially at its liquefaction temperature and substantially at atmospheric pressure. The temperature of the vapor generally is about −310° F. The rectification column is provided with the usual plates or bubble trays for separating the air into relatively pure oxygen and nitrogen. The oxygen collects as a liquid in the bottom of the column, from which it is withdrawn by a pipe 42; and the nitrogen effluent leaves the top of the column as a gas through pipes 14 and 15.

The portion of the nitrogen leaving the column through pipe 14 at a temperature of about −318° F. is led to exchanger 8, or to exchanger 9 when exchanger 8 is being derimed, where it absorbs heat from the incoming air. Most of this nitrogen, warmed to only a few degrees below the entering temperature of the air, leaves exchanger 8 through a pipe 16; and any desired proportion of it, as controlled by the operation of valves 17 and 18, may be recycled through the system in accordance with the refrigeration and liquid reflux requirements of the system. The amount so recycled passes through valve 18 to preferably two compressors 19 and 21, which are of a type requiring no internal oil lubrication, and through their respective coolers 20 and 22 for removing the heat of compression. The nitrogen gas is compressed to a pressure not usually greater than 80 to 100 lbs. per sq. in. absolute.

The compressed nitrogen then is cooled to a temperature considerably above its liquefaction temperature in a heat exchanger 23 by indirect heat exchange with the remaining portion of the nitrogen effluent leaving the column through pipe 15 and augmented by cold expanded nitrogen, as hereinafter described. A portion of the compressed nitrogen cooled in exchanger 23, as determined by the operation of a valve 25 in a branch pipe 24, is further cooled and partially liquefied in another exchanger or liquefier 26. It is then led through a pipe 27 to a reboiler 28 immersed in liquid oxygen in the lower end of the column. A portion of the liquid oxygen is vaporized by indirect heat exchange with the relatively warmer nitrogen flowing through the reboiler, thereby absorbing sufficient heat from that nitrogen to condense substantially all of the latter to a liquid. The oxygen thereby vaporized acts as vapor reflux in the rectification of air in the column. The liquid nitrogen, still under pressure, is led from the reboiler by a pipe 29 to a reflux cooler 30 wherein it is further cooled by indirect heat exchange with the cold gaseous nitrogen led to the cooler by pipe 15. The liquid nitrogen is then expanded by valve 31 to substantially atmospheric pressure and introduced into an upper level of the column 13 as liquid reflux.

The portion of the compressed nitrogen led off from between heat exchangers 23 and 26 through pipe 24 flows as a gas through valve 25 to a loaded expander 32, which preferably is a turbine of the radial flow reaction type, where the nitrogen is expanded with performance of external work.

This nitrogen is discharged from the expander substantially at atmospheric pressure and at its liquefaction temperature (approximately −318° F.) and, passing through a pipe 33, is commingled with the nitrogen effluent issuing from the top of the column through pipe 15, thereby augmenting the supply of cold gaseous nitrogen available for cooling the compressed nitrogen in reflux cooler 30, liquefier 26, and exchanger 23, as previously described. Another pipe to which pipe 33 may be connected, if desired, is pipe 14.

The warm nitrogen leaving heat exchanger 23 through pipe 34 can be either recycled through the compressors or discharged as nitrogen product. Valves 17 and 18, previously mentioned, and valves 35 and 36 permit the warm nitrogen in pipes 16 and 34 to be recycled or discharged in any proportion. Since the nitrogen in those two pipes will seldom be at the same temperature, it is preferable to recycle as much of the colder gas as possible and to discharge all or part of the warmer gas through a pipe 37. The nitrogen in pipe 37 may either be discharged directly into the atmosphere through a pipe 38 or, by closing a valve 39 and opening a valve 40, first be used to derime one of the exchangers 8 or 9 in the manner previously described and then discharged into the atmosphere through pipes 41 and 38. A path along which nitrogen may flow is indicated in the drawings by the arrows and valves.

Two expanders 32 and 32a are shown in the drawing, connected, respectively, to power absorbing devices 43 and 43a, such as electric generators, oil brakes or air blowers. Normally, only one of these expanders is in operation, the other one being used during the starting of the plant when rapid cooling is desired. In starting the plant, the temperature of the apparatus is first lowered to approximately the liquefaction temperature of air. This is accomplished, with the minimum introduction of impurities into the system, by recirculating the air previously cooled. To do this, valve 44 in the nitrogen discharge pipe 38 is closed and nearby valve 45 is opened, permitting the air to be recirculated through the blower 2. When the apparatus has been brought down to the desired temperature, blower 2 may be shut off in order to eliminate the warm end temperature losses of exchangers 8 and 9, and progressively purer nitrogen circulated in the system by means of compressors 19 and 21 alone until liquid nitrogen and oxygen in quantities sufficient to operate the column in the normal manner are obtained. Then valve 45 is closed and valve 44 is opened, the blower is started and one of the expanders is stopped. At this time a manually operated valve 46 in oxygen discharge pipe 42 is opened so that the liquid oxygen product can flow out of that pipe.

Automatic control of various critical phases of the process is obtained in the following manner. As already indicated, the refrigeration requirements of the system are met by the expansion of compressed nitrogen in expander 32. The flow of nitrogen to that expander is automatically controlled by valve 25 by a conventional float device 48 responding to the liquid level of the oxygen inside the tubes of the reboiler 28 at the bottom of the column. The liquid oxygen level reflects any excess or deficiency of refrigeration in the system. The amount of liquid reflux introduced into the column through valve 31 is controlled automatically by another float device 49 responsive to the liquid level of the nitrogen within the reboiler. The withdrawal of liquid oxygen from the column is controlled by a conventional electrical temperature differential controller 50 connected between the bottom and an intermediate point of the column. An automatic valve 47 in oxygen discharge line 42 is actuated by that controller; the valve is open when the temperature difference between the two selected points in the column is small and begins to close as the temperature difference increases. In this way, the rate of oxygen removal is controlled so as to yield a product of the desired purity.

It is a particular advantage of my invention, when it is used to produce liquid oxygen, that there is available in the auxiliary nitrogen cycle as much nitrogen as may be required for maintaining both the proper reflux ratio to rectify the air completely and sufficient refrigeration to compensate for that lost in the liquid oxygen withdrawn and for heat leakage and other thermodynamic losses of the system. By adjusting the speed of compressors 19 and 21, the desired amounts of nitrogen for both purposes may be compressed, and by adjusting valve 25, that portion necessary for extra refrigeration may be made to flow through expander 32, the balance being used as liquid reflux.

It is a further advantage of my system that the heat exchangers in the auxiliary nitrogen cycle never become plugged by impurities, because all condensible impurities have previously been removed from the gases passing through those exchangers and no other impurities are introduced.

In Fig. 2 is shown an apparatus for producing gaseous oxygen in accordance with my invention. This apparatus differs from that represented in Fig. 1 in that the liquid oxygen in the bottom of the column 13, instead of being withdrawn from the system, is vaporized and used as a rectifier-effluent to cool a portion of the compressed nitrogen in the auxiliary nitrogen cycle. Thus, the warm compressed nitrogen leaving compressor 21 and after-cooler 22 is divided into two fractions, the desired proportion of each being obtained by operation of valves 55 and 56. The fraction passing through valve 55 flows through heat exchanger 23, and part of it flows through exchanger 26 also. This last-mentioned part becomes cooled to substantially its liquefaction temperature by indirect heat exchange with cold nitrogen from pipe 57 connected to reflux cooler 30, and then is liquefied in the reboiler 28, subcooled in reflux cooler 30 and introduced into the upper part of the rectification column as liquid reflux after having been throttled to substantially atmospheric pressure by valve 31.

The compressed nitrogen passing through exchanger 23 but not exchanger 26 flows through a pipe 24 and automatic valve 25 to expander 32 where its pressure and temperature are reduced as previously described with reference to Fig. 1. The expanded nitrogen flows through pipe 33 back to part of the nitrogen rectifier-effluent, such as in pipe 15, to augment its cooling capacity. If the expanded nitrogen happens to be at a temperature higher than the gas in pipe 15, it can be introduced into pipe 57 by closing a valve 58 in pipe 33 and opening a valve 59 in a pipe 60 connecting pipes 33 and 57.

The remaining fraction of the warm nitrogen from compressor 21 passes through valve 56 to a heat exchanger 62, wherein it is cooled approximately to its liquefaction temperature by indirect heat exchange with cold gaseous oxygen withdrawn from the lower part of the column through a pipe 63. The cold nitrogen leaving exchanger 62 flows through a pipe 64 to pipe 27 where it mixes with the nitrogen leaving exchanger 26.

The liquid oxygen in the bottom of column 13 is vaporized by the relatively warmer nitrogen passing through the reboiler, thereby creating the vapor reflux required for rectification and also the gaseous oxygen effluent. As previously mentioned, the latter leaves the column through pipe 63, cools a portion of the compressed nitrogen in heat exchanger 62, and then is discharged as oxygen product through a pipe 65 into a suitable receptacle, or is used directly in an industrial process.

A function of the accumulator 11 in the gaseous oxygen plant is to trap any acetylene which, at the beginning of the clean-up cycle when the cold end of the exchangers is warmed slightly, may not be removed in the heat exchangers or may be sublimed by the air passing through those exchangers. The acetylene is gradually carried out of the accumulator at a substantially uniform rate which is slow enough to cause no trouble, since at no time does the rate of input of acetylene into the column exceed the rate at which acetylene is carried out of the column by the oxygen effluent.

If it is desired to obtain nitrogen, rather than oxygen, as an end product of consistent purity, oxygen may be used for periodically cleaning out the impurities deposited in exchangers 8 and 9. This can be done by closing a valve 69 in oxygen discharge pipe 65 while an automatically controlled valve 70 in the same pipe remains open, and leading the oxygen from that pipe through a pipe 71 and a valve 72 to the exchanger 8 or 9 that is to be derimed. The contaminated oxygen leaving an exchanger passes out of the system through a valve 73; a valve 74 in pipe 41 being closed so that the oxygen can not mix with the clean nitrogen. Nitrogen from the warm end of the exchanger through which air is flowing is led directly to pipe 16, and some of it flows through valve 17 to pipes 37 and 38. In this way the nitrogen product discharged from the system will not have come in contact with any volatile impurities and will be of consistently high purity. However, since less oxygen than nitrogen is available for the clean-up operation, the use of oxygen for that purpose will require a longer time to remove the impurities.

The plant shown in Fig. 2 is automatically controlled in the same general way as the liquid plant. To start it in operation, oxygen discharge valve 69 is closed, a valve 75 in pipe 71 is opened so that the oxygen will flow into pipe 38, nitrogen discharge valve 44 is closed, and valve 45 is opened. After the plant has been cooled down to substantially the liquefaction temperature of air, the blower may be stopped and the progressively purer nitrogen recycled through the compressors and expanders until sufficient liquid nitrogen and oxygen are produced to operate the plant continuously in normal manner. Then the valves just mentioned are turned to their operating positions for normal operation of the system.

The flexibility of the auxiliary nitrogen cycle, in allowing more or less nitrogen to be expanded in accordance with the refrigeration requirements of the system, is a distinct advantage in the production of gaseous oxygen. It permits gaseous oxygen to be produced economically even when the output of the plant is reduced considerably below its designed capacity. When less air is admitted to the system, the amount of nitrogen required for reflux will be proportionately reduced, but the amount required for refrigeration may not be because proportionately more may be needed to offset heat leakage into the system. That heat leakage varies in accordance with the external area of the apparatus and the differences between the internal and external temperatures thereof. It is not appreciably reduced by reducing the amount of air admitted to the system. However, by adjusting the speed of the compressors 19 and 21 to increase the relative amount of nitrogen recirculated, by diverting relatively more nitrogen to the expander 32, and by decreasing the output of the plant, it is possible to obtain under any given operating conditions an exact balance between the refrigeration required, and the refrigeration supplied to, the system. By suitable apparatus, not shown, including a flow meter, the speed of the compressors is controlled automatically by the flow of air into the system, or by the flow of oxygen from the system. Other advantages of this invention have been set forth in connection with the liquid oxygen system.

In the modification shown in Fig. 3 a single heat exchanger 77 has been substituted for the two exchangers 23 and 26 of Fig. 2. Cold compressed nitrogen may be led from pipe 27 through a pipe 78 and automatic valve 25 to expander 32, mixed with cold compressed nitrogen conducted from heat exchanger 62 to pipe 78 through a pipe 79. By regulating valves 55 and 56 to vary the amounts of gas flowing through pipes 78 and 79, the temperature of the nitrogen fed to the expander can be adjusted within desirable operating ranges because the gas leaving exchanger 62 is warmer than that leaving exchanger 77. If the flow of gas through pipe 79 is more than enough for the expander, then the surplus will flow through pipe 78 to pipe 27.

The apparatus shown in Fig. 1 for the production of liquid oxygen may be modified in various ways, one of which is illustrated in Fig. 4, without affecting the basic invention. In the latter figure, a portion of the cold nitrogen product leaving column 13 through pipe 14 is led by pipes 80 and 81 to heat exchangers 82 and 83. In the second exchanger the cold nitrogen absorbs heat from part of the warm compressed nitrogen leaving compressor 21 and after-cooler 22, and then is introduced through pipe 34 into the low pressure side of the compressors. In the first heat exchanger the cold nitrogen from pipe 80 absorbs additional heat from the same compressed nitrogen that flows through exchanger 83, and the warmed nitrogen leaves exchanger 82 by a pipe 85 connected to pipe 57 leading from reflux cooler 30. The combined streams of nitrogen leaving pipe 57 are introduced into a third heat exchanger 86, where it cools the remaining portion of the compressed nitrogen leaving compressor 21 through pipe 87. The warm nitrogen leaving exchanger 86 flows through a pipe 88 and pipes 34 and 16 to the low-pressure side of the compressors, where it is compressed and recycled along with the nitrogen warmed in exchanger 83 and so much of the nitrogen as flows through pipe 16.

The portion of the compressed nitrogen that is cooled in exchangers 82 and 83 enters the reboiler 28 where it is condensed, then subcooled in reflux cooler 30 and, after passing through expansion valve 31, is introduced into the upper part of the column as liquid reflux. The compressed nitrogen which is cooled in exchanger 88 is led through automatic valve 25 to the expander 32, and from there pipe 33 conducts it to pipe 15 at the top of the column. The rest of this system is the same as the one illustrated in Fig. 1.

The plant shown in Fig. 5 is one of many possible modifications of the gaseous oxygen producing plant illustrated in Fig. 2. In this modification all of the compressed nitrogen from compressor 21 flows through a pipe 91 and a heat exchanger 92 and then through pipe 27 to reboiler 28 in the lower end of the column 13. The compressed nitrogen flowing through this exchanger is cooled by part of the nitrogen flowing through pipe 57 from reflux cooler 30. This cooling nitrogen leaves exchanger 92 through pipe 34 which is connected to pipe 16 leading to the inlet of compressor 19.

Some of the nitrogen, compressed to only about forty pounds per square inch absolute by compressor 19, is led off from between the compressors by a pipe 93 that leads to a pair of heat exchangers 94 and 95 connected in parallel. The outlets of these two exchangers are connected by a pipe 96 and valve 25 to expander 32 which in turn is connected by pipe 33 to either of pipes 14 and 15 leading from the top of the column, or to pipe 57. The partially compressed nitrogen flowing through exchanger 94 is cooled by nitrogen flowing to it from pipe 57 through a branch pipe 97. This nitrogen, warmed in the exchanger, flows out through a pipe 98 to pipe 34 for recirculation through the compressors. The partially compressed nitrogen flowing through heat exchanger 95 is cooled by gaseous oxygen effluent delivered to it from the column through pipe 63. The rest of the system may be the same as the one shown in Fig. 2.

In all of these plants the control instruments and valves are subjected to very low temperatures so that their moving parts are likely to freeze fast if exposed to the moisture in the air. To prevent this, they may be surrounded by a dry atmosphere of cold nitrogen fro many suitable point in the plant. A number of the valves shown in the drawings are not mentioned herein, but their function will be apparent. Most of the valves are controlled automatically by the temperature, pressure or gas flow in the system. Of course, valves and by-passes in addition to those shown may be used if desired.

As only nitrogen is compressed in my cycle, and only the minimum amount needed to keep the cycle operating, no power is wasted in compressing air, which would require more power for compression per pound of oxygen obtained than with my cycle wherein the air is not used for refrigeration purposes. Also, with the high recovery that is characteristic of my system, there is less air introduced into the system per pound of oxygen recovered, and consequently a smaller amount of impurities to remove from the air. With this cycle, 98½% of the oxygen in the entering air can be recovered as a product without difficulty, while in prior systems a recovery of 85% of the oxygen has been considered good. This high recovery can be obtained with the use of less power than used in conventional plants wherein all of the air is compressed. In my gaseous cycle as little as nine-tenths of a pound of nitrogen need be compressed for each pound of air processed.

The preliminary refrigeration unit 4 before heat exchangers 8 and 9 provides the refrigeration for condensing the bulk of the water in the entering air before it reaches drier 6. Drier 6 removes still more water from the air and thereby decreases the rate of fouling of heat exchangers 8 and 9 so that the length of time required for fouling is greater than the time required for deriming. The use of preliminary refrigeration for drying the air also cools that air. This results in a low temperature of the nitrogen leaving exchangers 8 and 9. This nitrogen is fed to the compressors, since the power required to compress the cold nitrogen from exchangers 8 and 9 is less than that required for compressing the same quantity of warmer nitrogen from pipe 34.

As a matter of definition, the nitrogen and oxygen discharged from the plant are the products obtained by separating air, while the nitrogen and either gaseous or liquid oxygen leaving the rectifying column are referred to herein as rectifier-effluents. In the liquid plant the nitrogen flowing through pipe 14 is part of the two rectifier-effluents leaving the column through pipes 14, 15 and 42, so the nitrogen in pipe 15 is another portion of those effluents. In the gaseous oxygen plant the gas in pipe 14 is part of the two rectifier-effluents leaving the column through pipes 14, 15 and 63, so the nitrogen flowing through pipe 15 and the oxygen flowing through pipe 63 together constitute another portion of the two rectifier-effluents.

According to the provisions of the patent statutes, I have explained the principle, construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. In the low pressure method of separating a gaseous mixture into two fractions by cooling and rectification, the steps comprising cooling the mixture at substantially atmospheric pressure to about its liquefaction temperature, rectifying the cooled mixture to separate its less volatile fraction from its more volatile fraction, passing a portion of the cold more volatile fraction in heat exchange relation with the mixture to effect all of said cooling of the mixture, compressing at least some of the more volatile fraction that has been used to cool the mixture, cooling at least some of the compressed fraction by heat exchange with a second portion of the cold more volatile fraction, condensing part of the cooled compressed fraction by heat exchange with the cold less volatile fraction to obtain liquid reflux for use in rectifying the mixture, and expanding the remainder of the cooled compressed fraction with performance of external work to cool it further to about its liquefaction temperature to augment the supply of cold more volatile fraction.

2. A method according to claim 1 that includes the following additional step: compressing at least some of said second portion of the more volatile fraction that has been used to cool the compressed fraction to augment the supply of the latter.

3. A mehod according to claim 1, in which some of said compressed fraction is cooled by heat exchange with the less volatile fraction.

4. A method according to claim 1 that includes the following additional step: subcooling said condensed part of the compressed more volatile fraction, before it is used as liquid reflux in rectifying the mixture, by heat exchange with at least a part of said second portion of the cold more volatile fraction before the latter is used to cool said compressed fraction.

5. A method according to claim 1 that includes the following additional step: further cooling the first portion of the cooled compressed fraction, before it is condensed, to about its liquefaction temperature by heat exchange with cold more volatile fraction.

6. A method according to claim 1, in which said remainder of the cooled compressed fraction has been compressed to a lower pressure than the condensed part of said fraction and has been cooled in part by heat exchange with the less volatile fraction before being expanded.

7. A method according to claim 1 that includes the following additional steps: independently varying the portion of the more volatile fraction that is compressed and the portion thereof that is expanded in accordance with the quantity of the mixture to be rectified and with the amount of refrigeration required.

8. In the low pressure method of producing gaseous oxygen and gaseous nitrogen by cooling and rectifying air, the steps comprising cooling the air at substantially atmospheric pressure to about its liquefaction temperature, rectifying the cooled air to separate it into gaseous nitrogen and liquid and gaseous oxygen, passing a portion of the cold separated nitrogen in heat exchange relation with the air to effect all of said cooling of the air, compressing at least some of the nitrogen that has been used to cool the air, cooling the compressed nitrogen by heat exchange with a second portion of the cold separated nitrogen and with cold gaseous oxygen, condensing part of the cooled compressed nitrogen by heat exchange with liquid oxygen to obtain liquid reflux for use in rectifying the air, expanding the remainder of the cooled compressed introgen with performance of external work to cool it further to about its liquefaction temperature to augment the supply of cold separated nitrogen.

9. In the low pressure method of producing liquid oxygen and gaseous nitrogen by cooling and rectifying air, the steps comprising cooling the air at substantially atmospheric pressure to about its liquefaction temperature, rectifying the cooled air to separate it into liquid oxygen and gaseous nitrogen, passing a portion of cold separated nitrogen in heat exchange relation with the air to effect all of said cooling of the air, compressing at least some of the nitrogen that has been used to cool the air, cooling the compressed nitrogen by heat exchange with a second portion of cold separated nitrogen, condensing part of the cooled compressed nitrogen by heat exchange with liquid oxygen to obtain liquid reflux for use in rectifying the air, expanding the remainder of the cooled compressed nitrogen with performance of external work to cool it to about its liquefaction temperature to augment the supply of cold separated nitrogen.

10. Apparatus for separating a gaseous mixture into two fractions, comprising a heat exchanger for cooling the mixture at substantially atmospheric temperature to about its liquefaction temperature, a single rectifying column for rectifying the cooled mixture to separate its less volatile fraction from its more volatile fraction, a conduit for delivering a portion of the cold separated more volatile fraction to the exchanger as the sole cooling agent therein, a compressor for compressing at least some of the more volatile fraction that has been warmed in the exchanger, heat exchange means communicating with the outlet of the compressor for cooling the compressed fraction, conduit means for delivering a second portion of the cold separated more volatile fraction to said heat exchange means as a cooling agent therein, a reboiler at the lower end of the column for further cooling part of the cooled compressed fraction by heat exchange with the less volatile fraction at the bottom of the column to condense said part for use as liquid reflux in the column, an expander for further cooling the remainder of the cooled compressed fraction to about its liquefaction temperature by expanding it with performance of external work, and conduit means communicating with the outlet of the expander for adding the expanded fraction to the supply of either of said portions of cold separated more volatile fraction.

11. Apparatus according to claim 10 that includes the following additional element: conduit means for conducting at least some of said second portion of the separated more volatile fraction that has been used as a cooling agent in said heat exchange means to the inlet of said compressor to augment the supply of compressed more volatile fraction.

12. Apparatus according to claim 10 that includes the following additional element: conduit means for delivering cold separated less volatile fraction from the column to said heat exchange means as an additional cooling agent therein.

13. Apparatus according to claim 10 that includes the following additional element: a reflux cooler for receiving from said reboiler the condensed part of the compressed fraction and subcooling said part by heat exchange with at least some of said second portion of the cold separated more volatile fraction before the latter is used as a cooling agent in said heat exchange means.

14. Apparatus according to claim 10, in which said heat exchange means includes a pair of heat exchangers, one connected between the outlet of the compressor and the inlet of the reboiler and the other connected between the outlet of the compressor and the inlet of the expander.

15. Apparatus according to claim 10 that includes the following additional elements: a heat interchanger connected between said heat exchange means and the inlet of the reboiler for receiving and further cooling part of said cooled compressed fraction to about its liquefaction temperature before that part is condensed in the reboiler, and conduit means for conducting cold separated more volatile fraction to said heat interchanger as a cooling agent therein.

16. Apparatus according to claim 10 that includes the following additional element: a temperature and pressure equalizing accumulator connected in series between the heat exchanger and the column.

17. Apparatus for producing gaseous oxygen and gaseous nitrogen from air, comprising a heat exchanger for cooling the air at substantially atmospheric pressure to about its liquefaction temperature, a single rectifying column for rectifying the cooled air into gaseous and liquid oxygen and gaseous nitrogen, a conduit for delivering a portion of the cold separated nitrogen to the exchanger as the sole cooling agent therein, a compressor for compressing at least some of the nitrogen that has been warmed in the exchanger, heat exchange means for cooling the compressed nitrogen by heat exchange with a second portion of cold separated nitrogen and with cold separated gaseous oxygen, a reboiler at the lower end of the column for further cooling part of the cooled compressed nitrogen by heat exchange with liquid oxygen at the bottom of the column to condense said part for use as liquid reflux in the column, an expander for further cooling the remainder of the cooled compressed nitrogen to about its liquefaction temperature by expanding it with performance of external work, and a conduit for commingling the expanded nitrogen with the cold separated nitrogen to augment the supply of the latter.

18. Apparatus for producing liquid oxygen and gaseous nitrogen from air, comprising a heat exchanger for cooling the air at substantially atmospheric pressure to about its liquefaction temperature, a single rectifying column for rectifying the cooled air into liquid oxygen and gaseous nitrogen, a conduit for delivering a portion of the cold separated nitrogen to the exchanger as the sole cooling agent therein, a compressor for compressing at least some of the nitrogen that has been warmed in the exchanger, heat exchange means for cooling the compressed nitrogen by heat exchange with a second portion of cold separated nitrogen, a reboiler at the lower end of the column for further cooling part of the cooled compressed nitrogen by heat exchange with liquid oxygen at the bottom of the column to condense said part for use as liquid reflux in the column, an expander for further cooling the remainder of the cooled compressed nitrogen to about its liquefaction temperature by expanding it with performance of external work, and a conduit for commingling the expanded nitrogen with the cold separated nitrogen to augment the supply of the latter.

DUFFER B. CRAWFORD.

REFERENCES CITED

The following references are of record in the file of this patent:

UNITED STATES PATENTS

| Number | Name | Date |
|---|---|---|
| 1,521,115 | Mewes et al. | Dec. 30, 1924 |
| 1,605,646 | Claude | Nov. 2, 1926 |
| 2,002,940 | Frankl | May 28, 1935 |
| 2,423,273 | Van Nuys | July 1, 1947 |
| 2,424,201 | Van Nuys | July 15, 1947 |
| 2,482,303 | Van Nuys | Sept. 20, 1949 |